United States Patent Office 3,257,387
Patented June 21, 1966

3,257,387
6-METHYL-6-DEHYDRO PROGESTERONES
Howard J. Ringold, Mexico City, Mexico, assignor, by mesne assignments, to Syntex Corporation, a corporation of Panama
No Drawing. Filed May 19, 1960, Ser. No. 30,082
Claims priority, application Mexico, July 28, 1959, 55,401
25 Claims. (Cl. 260—239.55)

The present invention relates to novel cyclopentanophenanthrene compounds.

More particularly the invention relates to esters and cyclic acetals and ketals of 6-methyl-16($\alpha$ or $\beta$), 17$\alpha$-dihydroxy-$\Delta^{4,6}$-pregnadiene-3,20-dione and of 6-methyl-16($\alpha$ or $\beta$), 17$\alpha$-dihydroxy-$\Delta^{1,4,6}$-pregnatriene-3,20-dione.

The novel compounds of the present invention which are potent progestational agents are illustrated by the following formulas:

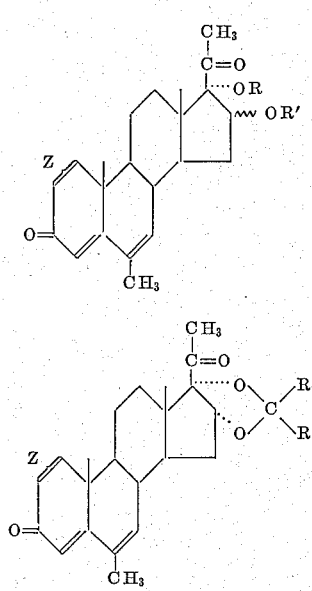

In the above formulas, Z indicates a double bond between C-1 and C-2 or a saturated linkage between C-1 and C-2. R and R[1] each represent an acyl group; R[2] and R[3] represent hydrogen or hydrocarbon groups such as aliphatic radicals containing from 1 to 8 carbon atoms of straight, branched, cyclic or mixed aliphatic-cyclic chain, saturated or unsaturated, including aromatic groups. Such ketals or acetals are formed by reaction of the 16$\alpha$,17$\alpha$-dihydroxy compounds with an aldehyde or ketone such as, for example, formaldehyde, acetaldehyde, benzaldehyde, acetone, benzophenone, cyclohexanone, or diethyl ketone in the presence of a catalyst such as perchloric acid.

The acyl group is derived from a hydrocarbon carboxylic acid containing from 1 to 12 carbon atoms, saturated or unsaturated, straight chain or branched chain aliphatic, cyclic, cyclic-aliphatic, aromatic and may be substituted by functional groups such as hydroxy, acyloxy of up to 12 carbon atoms, alkoxy of up to 8 carbon atoms, amino or halogen. Typical ester groups are the acetate, propionate, butyrate, hemisuccinate, enanthate, caproate, benzoate, cyclopentylpropionate, aminoacetate and $\beta$-chloropropionate. The acyl groups at C-16 and C-17 may be the same or different from each other.

The following equation serves to illustrate in part the preparation of the novel compounds of the present invention:

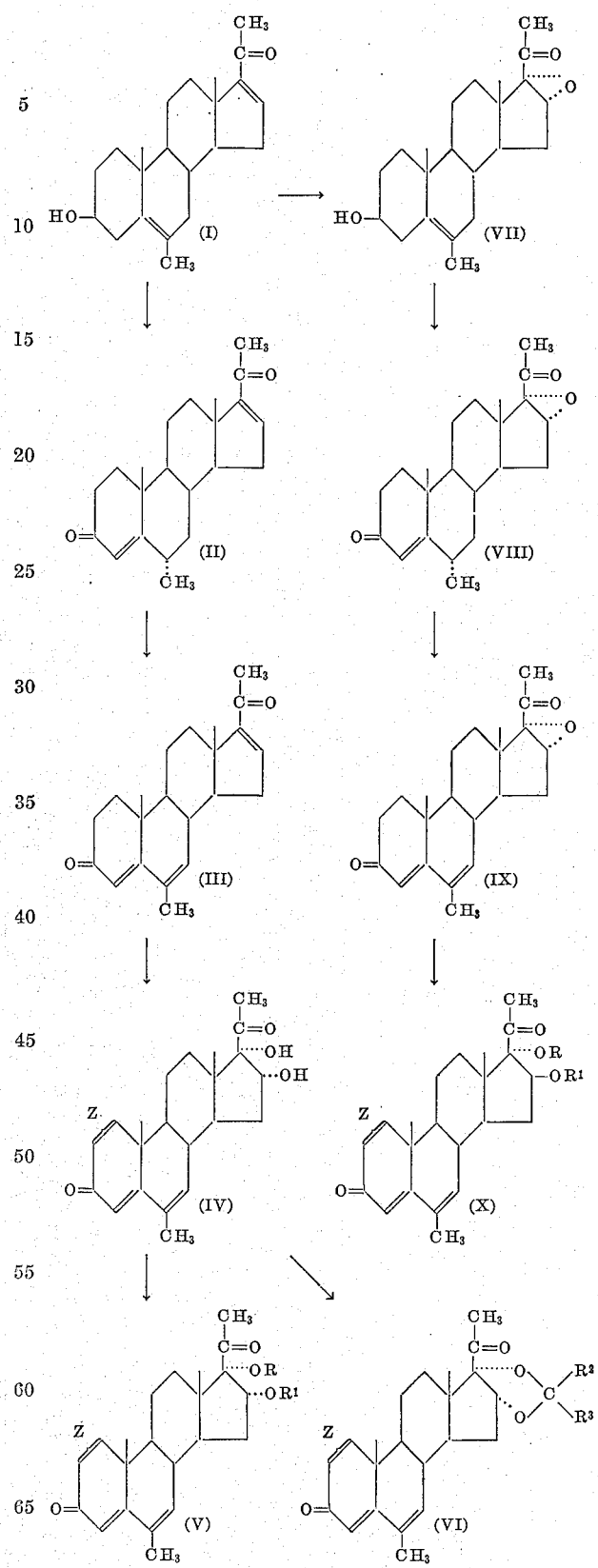

In the above formulas, R, R[1], R[2], R[3] and Z have the same meaning as previously set forth.

In practicing the process above outlined, 6-methyl-Δ$^{5,16}$-pregnadiene-3β-ol-20-one (I), disclosed by Petrow et al., J. Chem. Soc. 1957, 4094, is subjected to oxidation under Oppenauer conditions to form 6α-methyl-Δ$^{4,16}$-pregnadiene-3,20-dione (II). Alternatively, the oxidation of the 3β-hydroxyl group may be effected with 8 N chromic acid in acetone solution to form the 6-methyl-Δ$^5$-3-keto group which is transformed into the 6α-methyl-Δ$^4$-3-keto group by reaction with a mineral acid. The thus formed 6α-methyl-Δ$^{4,16}$-pregnadiene-3,20-dione (II) is dehydrogenated at C–6, 7 by refluxing with a quinone having an oxidation-reduction potential of less than —0.5, and preferably those having potentials of —0.65 or less, such as tetrachloro-p-benzoquinone (chloranil), tetrabromo-p-benzoquinone, 1,2- or 1,4-naphthoquinone, in an inert solvent such as tertiary butanol, xylene or a mixture of ethyl acetate and acetic acid or tertiary amyl acetate and acetic acid, under an atmosphere of nitrogen for a period of time ranging from a few hours to three days to form 6-methyl-Δ$^{4,6,16}$-pregnatriene-3,20-dione (III). The latter compound is treated with a slight excess of a molar equivalent of osmium tetroxide or potassium permanganate to form 6-methyl-Δ$^{4,6}$-pregnadiene-16α,17α-diol-3,20-dione (IV) which may then be reacted with an aldehyde or ketone to form the 16,17-cyclic acetal or ketal (VI) or with a carboxylic acid halide or anhydride in the presence of p-toluenesulfonic acid, with or without a diluent such as benzene, to form the 16,17-diester (V). For formation of the 16α-monoester, the esterification is conducted in pyridine solution; the thus formed monoester may then be further esterified with the same or a different acid chloride or anhydride in the presence of p-toluenesulfonic acid to form a diester having the same or different ester groups (V) of the type hereinabove set forth.

For introduction of an additional double bond between C–1 and C–2, the 16,17-cyclic acetal or ketal, the 16-ester or 16,17-diester is refluxed with selenium dioxide, preferably in mixture with tertiary butanol and in the presence of catalytic amounts of pyridine under an atmosphere of nitrogen.

Alternatively, 6-methyl-Δ$^{4,16}$-pregnadiene-3β-ol-20-one (I) is epoxidized by reaction with hydrogen peroxide under alkaline conditions to form 6-methyl-16α,17α-oxido-Δ$^5$-pregnen-3β-ol-20-one (VII), which by oxidation under Oppenauer conditions is transformed into 6α-methyl-16α,17α-oxido-Δ$^4$-pregnene-3,20-dione (VIII), which is dehydrogenated at C–6, 7 by refluxing with chloranil to form 6-methyl-16α,17α-oxido-Δ$^{4,6}$-pregnadiene-3,20-dione (IX). By treatment of the latter product with a carboxylic acid in mixture with sulfuric acid in accordance with the method of Heusler and Wettstein, B. 87, 1301 (1954), there is formed the 16-monoester of 6-methyl-Δ$^{4,6}$-pregnadiene-16β,17α-diol-3,20-dione (X) which upon subsequent treatment with a carboxylic acid halide or anhydride in the presence of p-toluenesulfonic acid is converted into the diester (X). A double bond may then be introduced at C–1, 2 by treatment with selenium dioxide in the same manner as set forth above.

The following examples serve to illustrate but are not intended to limit the scope of the present invention.

EXAMPLE I

In order to remove traces of moisture, about 32 cc. was distilled from a mixture of 6 g. of 6-methyl-Δ$^{5,16}$-pregnadien-3β-ol-20-one, 240 cc. of dry toluene and 48 cc. of cyclohexanone; a solution of 14 g. of aluminum isopropoxide in 50 cc. of dry toluene was then added and the mixture was refluxed for 1½ hours. It was diluted with 400 cc. of aqueous sodium tartrate solution, the solvents were removed by steam distillation and the aqueous residue was cooled. The solid was collected by filtration, washed with water, dried and recrystallized from methanol, thus yielding 6α-methyl-Δ$^{4,16}$-pregnadiene-3,20-dione.

A mixture of 5 g. of the above compound, 200 cc. of t-butanol and 1.8 g. of chloranil was refluxed under an atmosphere of nitrogen for 8 hours; it was then diluted with water and the precipitate was collected by filtration, dissolved in ethyl acetate and the solution was washed with aqueous sodium hydroxide solution until the washings were colorless, dried over anhydrous sodium sulfate and the solvent was evaporated. Recrystallization of the residue from acetone-hexane afforded 6-methyl-Δ$^{4,6,16}$-pregnatriene-3,20-dione.

To a solution of 4.2 g. of the above compound in 300 cc. of anhydrous ether was added 3 drops of pyridine and then 1.1 molar equivalents of osmium tetroxide; the mixture was kept at room temperature in the dark for 3 days. The solid was collected, well washed with ether, treated with 300 cc. of methanol and a solution of 21 g. of sodium sulfite in 150 cc. of water and refluxed for 16 hours. After cooling the precipitate was collected, washed with hot ethanol, the filtrate and washings were combined and concentrated to a volume of 100 cc. The solution was then poured into ice water and extracted with ethyl acetate; the extract was washed with water, dried over anhydrous sodium sulfate and evaporated to dryness. By chromatography of the residue on neutral alumina there was obtained 6-methyl-Δ$^{4,6}$-pregnadiene-16α,17α-diol-3,20-dione.

A mixture of 3 g. of the above compound, 75 cc. of acetic acid, 15 cc. of acetic anhydride and 3 g. of p-toluenesulfonic acid was kept for 3 hours at room temperature, concentrated to a small volume under reduced pressure in a bath at a temperature below 40° C., poured into ice water and the precipitate was collected, washed with water, dried and recrystallized from acetone-hexane, thus affording the diacetate of 6-methyl-Δ$^{4,6}$-pregnadiene-16α,17α-diol-3,20-dione.

A mixture of 3 g. of the above compound, 200 cc. of t-butanol, a few drops of pyridine and 1 g. of selenium dioxide was refluxed under an atmosphere of nitrogen for 48 hours. It was then filtered through celite while still hot and the filtrate after partial concentration was poured into ice water; the solid was collected, washed with water, dried and purified by chromatography on neutral alumina, thus giving the diacetate of 6-methyl-Δ$^{1,4,6}$-pregnatriene-16α,17α-diol-3,20-dione.

EXAMPLE II

In accordance with the method described in the preceding example, there was prepared 5 g. of 6-methyl-Δ$^{4,6,16}$-pregnatriene-3,20-dione, which was dissolved in a mixture of 150 cc. of acetone and 1 cc. of acetic acid, cooled to 0° C. and treated with 1.1 molar equivalents of potassium premanganate dissolved in 50 cc. of 85% aqueous acetone, in the course of 5 minutes, at 0° C. and under continuous stirring; the mixture was then stirred with 20 cc. of saturated aqueous sodium sulfite solution, filtered through celite and the filtrate was concentrated to 20° C. under reduced pressure; it was then poured into ice water and the precipitate formed was collected, washed with water, dried and recrystallized from aqueous acetone, thus furnishing 6-methyl-Δ$^{4,6}$-pregnadiene-16α,17α-diol-3,20-dione, identical with the intermediate described in the preceding example.

2 g. of the above compound was treated with 1 cc. of propionic anhydride in 10 cc. of pyridine, overnight at room temperature; after pouring into water, the mixture was heated on the steam bath for half an hour, cooled and the precipitate was collected by filtration, washed with water, dried and recrystallized from acetone-hexane, thus giving the 16-propionate of 6-methyl-Δ$^{4,6}$-pregnadiene-16α,17α-diol-3,20-dione.

A solution of 2 g. of the above compound in 100 cc. of anhydrous benzene was treated with 3 g. of caproic anhydride and 1 g. of p-toluenesulfonic acid and kept at room temperature for 48 hours. It was then poured into water, stirred for 1 hour on the steam bath, cooled, extracted with benzene and the extract was successively washed with 5% aqueous sodium bicarbonate solution and water, dried over anhydrous sodium sulfate and evaporated to dryness. By chromatography of the residue on neutral alumina there was obtained the 16-propionate-17-caproate of 6-methyl-$\Delta^{4,6}$-pregnadiene-16$\alpha$,17$a$-diol-3,20-dione.

A mixture of 1 g. of the above compound, 300 mg. of selenium dioxide, 75 cc. of t-butanol and a few drops of pyridine was refluxed under an atmosphere of nitrogen for 48 hours and the product was then isolated as described in Example I for the reaction with selenium dioxide, thus producing the 16-propionate-17-caproate of 6-methyl-$\Delta^{1,4,6}$-pregnatriene-16$\alpha$,17$a$-diol-3,20-dione.

EXAMPLE III

A mixture of 1 g. of 6-methyl-$\Delta^{4,6}$-pregnadiene-16$\alpha$,17$\alpha$-diol-3,20-dione of the preceding example, 100 cc. of benzene, 2 cc. of acetic anhydride and 500 mg. of p-toluenesulfonic acid was kept at room temperature for 24 hours; it was then poured into 100 cc. of water, stirred for half an hour on the steam bath, cooled and the benzene layer was separated, successively washed with aqueous sodium bicarbonate solution and water, dried over anhydrous sodium sulfate and the benzene was evaporated. Recrystallization of the residue from acetone-hexane afforded the diacetate of 6-methyl-$\Delta^{4,6}$-pregnadiene-16$\alpha$,17$\alpha$-diol-3,20-dione, identical with the intermediate set forth in Example I.

EXAMPLE IV

To a stirred solution of 1.3 g. of 6-methyl-$\Delta^{4,6}$-pregnadiene-16$\alpha$,17$\alpha$-diol-3,20-dione (see Example II) in 35 cc. of acetone was added 0.35 cc. of 72% perchloric acid and stirred at room temperature for 1 hour. There was then added 200 ml. of 5% aqueous sodium bicarbonate solution. The precipitate was collected by filtration, washed with water, dried and recrystallized from acetone-hexane, thus yielding 6-methyl-16$\alpha$,17$\alpha$-isopropylidenedioxy-$\Delta^{4,6}$-pregnadiene-3,20-dione, namely the acetonide of 6-methyl-$\Delta^{4,6}$-pregnadiene-16$\alpha$,17$\alpha$-diol-3,20-dione.

1 g. of the above compound was then dehydrogenated by the reaction with selenium dioxide, essentially following for this reaction the procedure described in Example I; there was thus obtained the acetonide of 6-methyl-$\Delta^{1,4,6}$-pregnatriene-16$\alpha$,17$\alpha$-diol-3,20-dione.

EXAMPLE V

In accordance with the method described in Example I, there was prepared 2 g. of 6-methyl-$\Delta^{4,6}$-pregnadiene-16$\alpha$,17$\alpha$-diol-3,20-dione, which was dissolved in 100 cc. of benzene, treated with a solution of paraformaldehyde and benzene and then with 0.7 cc. of 72% perchloric acid. The mixture was stirred at room temperature for 6 hours, then washed with 5% aqueous sodium bicarbonate solution and finally with water to neutral, dried over anhydrous sodium sulfate and the benzene was evaporated. Recrystallization of the residue from acetone-hexane afforded 6 - methyl-16$\alpha$,17$\alpha$-methylenedioxy-$\Delta^{4,6}$-pregnadiene-3,20-dione, namely the formaldehyde-acetal of 6-methyl-$\Delta^{4,6}$-pregnadiene-16$\alpha$,17$\alpha$-diol-3,20-dione.

1 g. of the above compound was treated with selenium dioxide in accordance with the method described in Example I, thus giving the formaldehyde-acetal of 6-methyl-$\Delta^{1,4,6}$-pregnatriene-16$\alpha$,17$\alpha$-diol-3,20-dione.

EXAMPLE VI

In accordance with the method described in Example I, there was prepared 2 g. of 6-methyl-$\Delta^{4,6}$-pregnadiene-16$\alpha$,17$\alpha$-diol-3,20-dione, which was then treated with an excess of benzaldehyde, in the presence of perchloric acid, essentially following the method of the preceding example; there was thus obtained 6-methyl-16$\alpha$,17$\alpha$-benzylidenedioxy-$\Delta^{4,6}$-pregnadiene-3,20-dione, wherein there was then introduced a third double bond at C–1,2 by the reaction with selenium dioxide described in Example I.

EXAMPLE VII

To a stirred solution of 10 g. of 6-methyl-$\Delta^{5,16}$-pregnadien-3$\beta$-ol-20-one in 700 cc. of methanol cooled to 0° C., there were simultaneously added in a thin stream 20 cc. of 4 N aqueous sodium hydroxide solution and 40 cc. of 30% hydrogen peroxide aqueous solution, maintaining the temperature below 15° C. The mixture was kept overnight in the refrigerator, poured into 2750 cc. of ice water and the precipitate formed was collected by filtration, washed with water, dried and recrystallized from acetone-hexane. There was thus obtained 6-methyl-16$\alpha$, 17$\alpha$-oxide-$\Delta^5$-pregnen-3$\beta$-ol-20-one.

By subsequent oxidation with aluminum isopropylate in toluenecyclohexanone, in accordance with the method described in Example I, there was obtained 6$\alpha$-methyl-16$\alpha$,17$\alpha$-oxido-$\Delta^4$-pregnene-3,20-dione.

By following the method of dehydrogenation described in Example I, 8 g. of the above compound was treated with chloranil under reflux in t-butanol, thus giving 6-methyl-16$\alpha$, 17$\alpha$-oxido-$\Delta^{4,6}$-preganadiene-3,20-dione.

A solution of 6 g. of the above compound in 120 cc. of glacial acetic acid was slowly treated under stirring at 15° C., with a mixture of 2.5 cc. of concentrated sulfuric acid and 10 cc. of acetic acid. The mixture was kept at room temperature for 8 hours, poured into 700 cc. of water and the precipitate formed was collected, washed with water, dried and recrystallized from acetone hexane, thus affording the 16-acetate of 6-methyl-$\Delta^{4,6}$-pregnadiene-16$\beta$,17$\alpha$-diol-3,20-dione.

3 g. of the above compound was treated with acetic anhydride in the presence of glacial acetic acid, as described for this acetylation in Example I, to produce the diacetate of 6-methyl-$\Delta^{4,6}$-pregnadiene-16$\beta$,17$\alpha$-diol-3,20-dione. By subsequent dehydrogenation with selenium dioxide (cf. Example I) there was finally obtained the diacetate of 6-methyl-$\Delta^{1,4,6}$-pregnatriene-16$\beta$,17$\alpha$-diol-3,20-dione.

EXAMPLE VIII

In accordance with the method of the preceding example, there was prepared 3 g. of 6-methyl-16$\alpha$,17$\alpha$-oxido-$\Delta^{4,6}$-pregnadiene-3,20-dione, which was dissolved in 60 cc. of propionic acid and then treated with a mixture of 1.25 cc. of concentrated sulfuric acid and 8 cc. of propionic acid, stirring at room temperature for 1 hour and then letting the mixture stand at room temperature for 24 hours. After pouring into 700 cc. of ice water the precipitate was cooled, washed with water, dried and purified by chromatography on neutral alumina. There was thus obtained the 16-propionate of 6-methyl-$\Delta^{4,6}$-pregnadiene-16$\beta$,17$\alpha$-diol-3,20-dione.

By following the method described in Example I for the esterification of the hydroxyl group at C–17 by reaction with caproic anhydride, 1 g. of the above monopropionate was treated with cyclopentylpropionic anhydride in benzene and in the presence of p-toluenesulfonic acid to produce the 16-propionate-17-cyclopentylpropionate of 6-methyl-$\Delta^{4,6}$-pregnadiene-3,20-dione.

By subsequent dehydrogenation with selenium dioxide as described in Example I, there was finally afforded the 16 - propionate-17 - cyclopentylpropionate of 6 - methyl-$\Delta^{1,4,6}$-pregnatriene-16$\beta$,17$\alpha$-diol-3,20-dione and by dehydrogenation of the above 16-propionate of 6-methyl-$\Delta^{4,6}$-pregnadiene-17$\alpha$-diol-3,20-dione, there was obtained the 16-propionate of 6-methyl-$\Delta^{1,4,6}$-pregnatriene-16$\beta$, 17$\alpha$-diol-3,20-dione.

EXAMPLE IX

By substituting other carboxylic acid anhydrides containing up to 12 carbon atoms such as, for example, propionic, butyric and caproic anhydrides, in the procedures set forth in Examples I, III and VII, there were obtained the corresponding dipropionates, dibutyrates and dicaproates

EXAMPLE X

By substituting acetic anhydride for caproic anhydride in the method of Example II, there was obtained the 16-propionate-17-acetate of 6-methyl-Δ[4,6]-pregnadiene-16α,17α-diol-3,20-dione.

EXAMPLE XI

A mixture of 3.0 g. of the 16-propionate of 6-methyl-Δ[4,6]-pregnadiene-16β,17α-diol-3,20-dione obtained in Example VII and 5 cc. of a 1% of a methanolic solution of potassium hydroxide was stirred for 1 hour at 0° C. under an atmosphere of nitrogen; after acidifying with a few drops of acetic acid, the solvent was removed under vacuum and the residue crystallized from acetone, thus yielding the free 6-methyl-Δ[4,6]-pregnadiene-16β,17α-diol-3,20-dione.

In a similar manner, the 16-propionate of 6-methyl-Δ[1,4,6]-pregnatriene-16β,17α-diol-3,20-dione.
Example VIII was transformed into the free 6-methyl-Δ[1,4,6]-pregnatriene-16β,17α-diol-3,20-dione.

I claim:
1. A compound of the following formula:

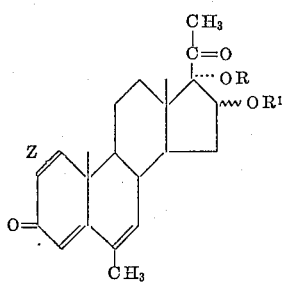

wherein R and R[1] each represent an acyl group of a hydrocarbon carboxylic acid of less than 12 carbon atoms and Z is selected from the group consisting of a double bond between C-1 and C-2 and a saturated linkage between C-1 and C-2.

2. The diacetate of 6-methyl-Δ[4,6]-pregnadiene-16α,17α-diol-3,20-dione.
3. The diacetate of 6-methyl-Δ[4,6]-pregnadiene-16β,17α-diol-3,20-dione.
4. The diacetate of 6-methyl-Δ[1,4,6]-pregnatriene-16α,17α-diol-3,20-dione.
5. The diacetate of 6-methyl-Δ[1,4,6]-pregnatriene-16β,17α-diol-3,20-dione.
6. The 16-propionate of 6-methyl-Δ[4,6]-pregnadiene-16α,17α-diol-3,20-dione.
7. The 16-propionate-17-caproate of 6-methyl-Δ[4,6]-pregnadiene-16α,17α-diol-3,20-dione.
8. The 16-propionate-17-caproate of 6-methyl-Δ[1,4,6]-pregnatriene-16α,17α-diol-3,20-dione.
9. The 16-propionate of 6-methyl-Δ[4,6]-pregnadiene-16β,17α-diol-3,20-dione.
10. The 16-propionate-17-cyclopentylpropionate of 6-methyl-Δ[4,6]-pregnadiene-16β,17α-diol-3,20-dione.
11. The 16-propionate of 6-methyl-Δ[1,4,6]-pregnatriene-16β,17α-diol-3,20-dione.
12. The 16-propionate-17-cyclopentylpropionate of 6-methyl-Δ[1,4,6]-pregnatriene-16β,17α-diol-3,20-dione.
13. A compound of the following formula:

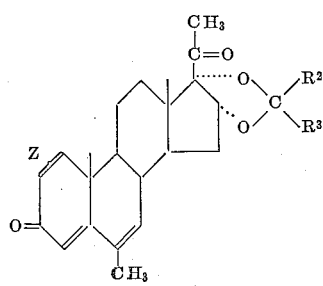

wherein R[2] and R[3] are each selected from the group consisting of hydrogen and a hydrocarbon radical containing up to 8 carbon atoms and Z is selected from the group consisting of a double bond between C-1 and C-2 and a saturated linkage between C-1 and C-2.

14. The acetonide of 6-methyl-Δ[4,6]-pregnadiene-16α,17α-diol-3,20-dione.
15. The acetonide of 6-methyl-Δ[1,4,6]-pregnatriene-16α,17α-diol-3,20-dione.
16. The formaldehyde-acetal of 6-methyl-Δ[4,6]-pregnadiene-16α,17α-diol-3,20-dione.
17. The formaldehyde-acetal of 6-methyl-Δ[1,4,6]-pregnatriene-16α,17α-diol-3,20-dione.
18. 6-methyl-16α,17α-benzylidenedioxy-Δ[4,6]-pregnadiene-3,20-dione.
19. 6-methyl-16α,17α-benzylidenedioxy-Δ[1,4,6]-pregnatriene-3,20-dione.
20. A compound of the following formula:

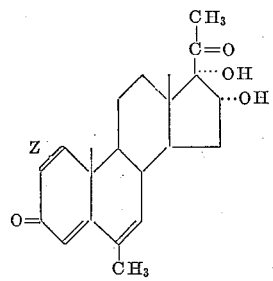

wherein Z is selected from the group consisting of a double bond between C-1 and C-2 and a saturated linkage between C-1 and C-2.

21. 6-methyl-Δ[4,6]-pregnadiene-16α,17α-diol-3,20-dione.
22. 6-methyl-Δ[1,4,6]-pregnatriene-16α,17α-diol-3,20-dione.
23. A compound of the following formula:

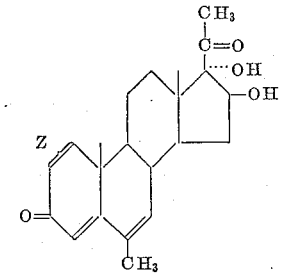

wherein Z is selected from the group consisting of a double bond between C-1 and C-2 and a saturated linkage between C-1 and C-2.

24. 6-methyl-Δ[4,6]-pregnadiene-16β,17α-diol-3,20-dione.
25. 6-methyl-Δ[1,4,6]-pregnatriene-16β,17α-diol-3,20-dione.

No references cited.

LEWIS GOTTS, *Primary Examiner.*

MORRIS LEIBMAN, LESLIE H. GASTON, ELBERT L. ROBERTS, G. E. LANDE, *Assistant Examiners.*